(12) United States Patent
Middelberg et al.

(10) Patent No.: US 9,795,082 B2
(45) Date of Patent: Oct. 24, 2017

(54) AGRICULTURAL WORKING MACHINE

(71) Applicant: CLAAS SELBSTFAHRENDE ERNTEMASCHINEN GMBH, Harsewinkel (DE)

(72) Inventors: Rene Middelberg, Osnabrueck (DE); Markus Brune, Harsewinkel (DE); Frank Claussen, Greffen (DE); Norbert Diekhans, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 14/635,036

(22) Filed: Mar. 2, 2015

(65) Prior Publication Data
US 2015/0245560 A1 Sep. 3, 2015

(30) Foreign Application Priority Data

Mar. 3, 2014 (DE) .................. 10 2014 102 789

(51) Int. Cl.
*A01F 12/58* (2006.01)
*A01F 12/16* (2006.01)
(Continued)

(52) U.S. Cl.
CPC ....... *A01D 41/1277* (2013.01); *A01D 41/127* (2013.01); *A01D 41/1271* (2013.01);
(Continued)

(58) Field of Classification Search
CPC .......... A01F 12/58; A01F 12/16; A01F 12/18; A01D 41/127; A01D 41/1277; A01D 41/1271

USPC ............................................ 56/10.2 B; 460/7
See application file for complete search history.

(56) References Cited

U.S. PATENT DOCUMENTS 5,969,243 A * 10/1999 Frey ..................... G01N 27/223
324/689
6,185,990 B1 * 2/2001 Missotten ............ A01B 79/005
324/691

(Continued)

FOREIGN PATENT DOCUMENTS

EP          1576869          9/2005

OTHER PUBLICATIONS

Fuchs, A., et al: "Using capacitive sensing to determine the moisture content of wood pellets—investigation and application", International Journal on Smart Sensing and Intelligent systems, vol. 2., Jun. 2009, pp. 293-308 (in Enlgish).

(Continued)

*Primary Examiner* — John G Weiss
(74) *Attorney, Agent, or Firm* — Michael J. Striker

(57) ABSTRACT

An agricultural working machine embodying a combine harvester for processing crop includes an intake conveyor mechanism for picking up the crop, a moisture content sensor arrangement for measuring a moisture content of the picked-up crop and generating a crop moisture signal based on the measured moisture content. A throughput sensor arrangement, preferably a layer thickness sensor arrangement, determines a throughput quantity of the picked-up crop. The crop moisture content signal is corrected on a basis of the throughput quantity that is determined.

20 Claims, 5 Drawing Sheets

(51) Int. Cl.
*A01D 41/127* (2006.01)
*A01D 57/20* (2006.01)
*A01F 12/18* (2006.01)

(52) U.S. Cl.
CPC .............. *A01D 57/20* (2013.01); *A01F 12/18* (2013.01); *A01F 12/58* (2013.01)

(56) References Cited

U.S. PATENT DOCUMENTS

| | | | | |
|---|---|---|---|---|
| 6,389,884 | B1* | 5/2002 | Diekhans | G01N 25/56 |
| | | | | 460/7 |
| 6,584,755 | B2* | 7/2003 | Holtkotte | A01D 43/086 |
| | | | | 56/10.2 B |
| 7,077,743 | B2* | 7/2006 | Quincke | A01D 43/085 |
| | | | | 460/114 |
| 8,337,283 | B2* | 12/2012 | Kormann | A01D 41/127 |
| | | | | 460/7 |
| 2010/0121541 | A1* | 5/2010 | Behnke | A01D 41/1277 |
| | | | | 701/50 |

OTHER PUBLICATIONS

W.C. Wang, L. Wang: "Design of Moisture Content Detection System", 2012 International conference on Medical Physics and Biomedical Engineering, SciVerse ScienceDirect, Physics Procedia 33, 2012, pp. 1408-1411 (in Enlgish).
Litronic-FMS II Zuverlassige Feuchtemessung (product brochure), Liebherr-Mischtechnik GmbH, Bad Schussenried, Germany, 2012, pp. 1-4 (with English translation).

\* cited by examiner

AGRICULTURAL WORKING MACHINE

CROSS-REFERENCE TO A RELATED APPLICATION

The invention described and claimed hereinbelow is also described in German Patent Application DE 10 2014 102 789.2, filed on Mar. 3, 2014. The German Patent Application, the subject matters of which is incorporated herein by reference, provides the basis for a claim of priority of invention under 35 U.S.C. 119(a)-(d).

BACKGROUND OF THE INVENTION

The present invention relates to an agricultural working machine with a moisture content sensor arrangement for measuring a moisture content of picked-up crop and generating a crop moisture signal based on the measured moisture content.

Agricultural working machines, which include self-propelled harvesting machines such as combine harvesters, customarily comprise diverse working devices that can be operated with fluctuating parameters during the processing of crop. The setting of these parameters is referred to as a machine parameter setting. In order to ensure optimal operation, the machine parameter setting should be set depending on various basic conditions, including, in particular, the type, amount, and condition of the stand in the field and/or the crop.

In fact, one significant basic condition is the moisture content of the crop in the crop stream as a whole, which is determined substantially via the moisture content of the straw, i.e., the straw moisture content. An accurate determination of the moisture content of the crop is very helpful for an optimal setting of the machine parameters.

It is known from the prior art to determine the moisture content of the grain material after the grain material has been separated from the rest of the crop. However, the moisture content of the grain material does not always provide sufficiently precise information on the moisture content of the crop since this is not typically the determining variable for the moisture content of the crop.

From document EP 1 576 869, it is known to determine the moisture content of the crop using a moisture sensor disposed in the feeder housing of a combine harvester. In this manner, it is possible to determine and react to the moisture content of the crop continuously and nearly simultaneously with the pick-up of the crop by the agricultural working machine.

The disadvantage of this prior art is that the measurement of the moisture content can be inaccurate, especially when the moisture sensor is designed as a capacitive sensor. This is due to the fact that such a sensor substantially measures and determines the entire quantity of water that moves past the sensor. However, this total quantity of water is dependent not only on the relative moisture content of the crop, but also on the entire quantity of crop that was picked up at the time of the measurement. As a result, the moisture content that is measured is often falsified upward when the crop throughput is relatively high, and is falsified downward when the crop throughput is low.

Proceeding from this prior art, the problem addressed by the invention is that of developing an agricultural working machine such that a highly accurate determination of the moisture content in the crop is even more accurate.

SUMMARY OF THE INVENTION

The present invention overcomes the shortcomings of known arts, such as those mentioned above.

In an embodiment, the invention provides an agricultural working machine with a moisture content sensor arrangement for measuring a moisture content of picked-up crop and generating a crop moisture signal based on the measured moisture content, which corrects the generated crop moisture signal on the basis of a determined pick-up crop throughput quantity.

The throughput quantity of the crop that is currently being picked up is often detected by sensors. A layer thickness sensor is typically provided, which determines the current throughput of picked-up crop in the region of a feed drive and, in particular, at the feed rake. The invention uses this determination of the current throughput quantity to correct the measurement of the moisture content of the picked-up crop. It is therefore possible to correct the influence of the picked-up throughput quantity, which falsifies values in the above-described manner, with respect to the moisture content that is measured such that a more accurate value of the moisture content is provided for the machine parameter setting.

The interrelationship between the throughput quantity that is determined and an adjustment of the moisture content that is measured can be defined by a function that is described as a throughput correction function.

The proposed solution makes it possible to account for the phenomenon that the detection of moisture content is highly inaccurate below a certain crop throughput quantity. The crop moisture content signal also can be corrected on the basis of a crop type determination. For that matter, where the determined throughput quantity drops below a minimum throughput quantity, the crop moisture content signal is preferably corrected to a value of the crop moisture content signal that existed before the value fell below the minimum throughput and held thereat.

Conversely, once a certain throughput quantity is exceeded, the interrelationship between the throughput quantity and the moisture content that is measured no longer exists or is at least not substantial, and therefore it is not necessary to make a correction in this range. So in an embodiment, where it is determined that throughput quantity exceeds a maximum throughput, the crop moisture content signal remains substantially unchanged by the correction.

Preferably, when a determined throughput quantity is located within the correction range, the crop moisture content signal is corrected such that a moisture content of the picked-up crop, which is measured by the moisture content sensor arrangement and is related as a whole to the determined throughput quantity, is located between the maximum throughput and the minimum throughput.

In an embodiment, the moisture content sensor arrangement and/or the layer thickness sensor arrangement is disposed on the intake conveyor mechanism, preferably in a feeder housing of the intake conveyor mechanism. Preferably, the moisture content sensor arrangement is set up to contactlessly measure the moisture content of the picked-up crop, such as in a form of a capacitive sensor.

In an embodiment, a control arrangement that activates the working devices regulates the working devices on the basis of the crop moisture content signal. The control arrangement comprises automated machine setting devices, each of which is assigned to a working device for activating the working device, where the control arrangement determines operating parameters of the automated machine setting devices on the basis of the corrected crop moisture content signal.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
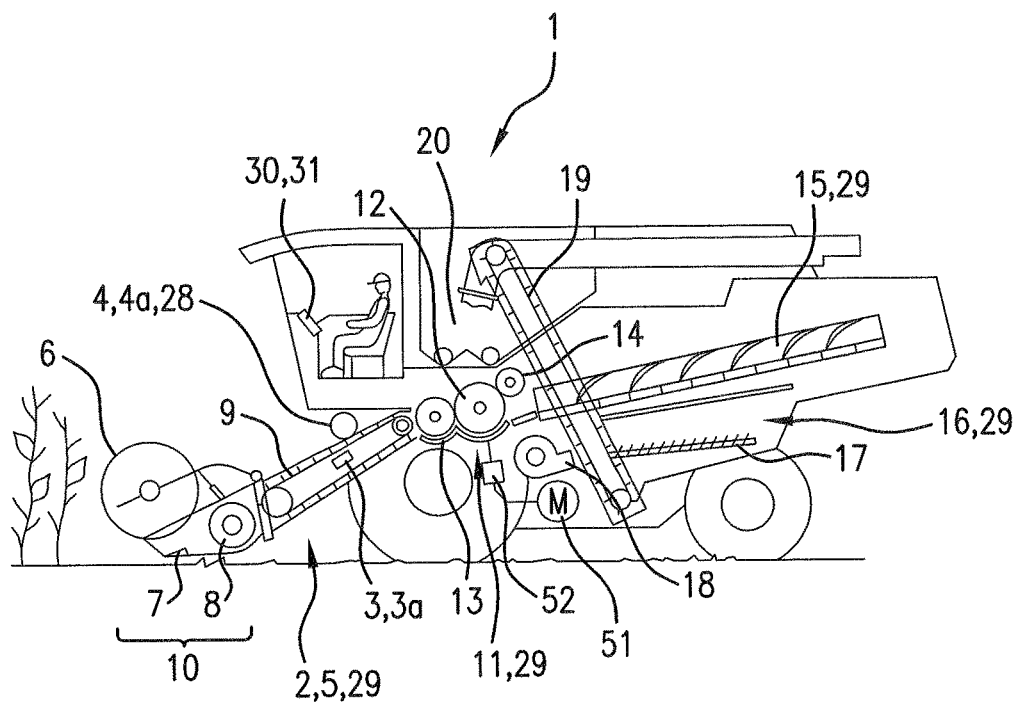
FIG. 1 shows a schematic side view of a combine harvester, as the agricultural working machine according to the invention.

FIG. 1 depicts an agricultural working machine embodying a combine harvester 1 set up to process crop. The combine harvester 1 comprises an intake conveyor mechanism 2 for picking up the crop, a moisture content sensor arrangement 3 for measuring a moisture content of the picked-up crop and generating a crop moisture signal based on the measured moisture content and a throughput sensor arrangement 4, which is preferably a layer thickness sensor arrangement 4a, for determining a throughput quantity of the picked-up crop.

The agricultural working machine is characterized in that the crop moisture content signal is corrected on the basis of the throughput quantity that is determined. A correction in this sense can comprise any adjustment of the crop moisture content signal that is dependent on the throughput quantity that is determined. The adjustment is carried out by a percentage adjustment, for example, by a multiplication, by the addition or subtraction of a displacement value or by assigning a fixed value to the crop moisture content signal.

In addition, this correction can apply only for a certain value range of either the measured moisture content or the determined throughput quantity and can therefore be omitted outside of one of these ranges. It is therefore not necessary for the crop moisture content signal to be changed via the correction in every case and under all conditions, wherein explanatory examples thereof are provided below. The correction of the crop moisture content signal can comprise replacing the previous crop moisture content signal as well as generating a new crop moisture content signal, which is based on the original crop moisture content signal and takes the correction into account.

The intake conveyor mechanism can be a front attachment 5, which comprises a reel 6, a finger bar 7, and a header auger 8, as depicted in FIG. 1. The front attachment further comprises a feed rake 9. The reel 6, the finger bar 7 and the header auger 8 are referred to herein collectively as a header 10. The crop that is cut and drawn in by the header 10 is further conveyed, as a crop stream, by the feed rake 9 for further processing in the combine harvester 1. The crop is therefore picked up by the intake conveyor mechanism 2.

Proceeding from the feed rake 9, the picked-up crop reaches the threshing mechanism 11, which comprises the cylinder 12 and the concave 13. A guide drum 14 is disposed downstream of the threshing mechanism 11 in the conveyance direction and conveys the crop stream into the separating device 15 for separating out freely movable grains. The separating device is followed by a cleaning device 16 having one or more sieve levels 17 and a blower 18. Located further downstream are a grain elevator 19 and a grain tank 20, which also are depicted in FIG. 1.

The crop moisture content signal is preferably generated substantially continuously. This means that the crop moisture content signal is generated either continuously or at least within a short time interval between the detection times. As an alternative or in addition thereto, the continuous generation also applies for the throughput quantity. The crop moisture content signal can therefore be generated on-line and, therefore, more or less in real time, and the throughput quantity can also be determined more or less in real time. The result of the combination thereof is that, preferably, the crop moisture content signal is corrected substantially continuously on the basis of the throughput quantity that is determined. Therefore, the corrected crop moisture content signal is also always current.

Furthermore, the crop moisture content signal is preferably corrected on the basis of the determined throughput quantity by a throughput correction function. Such a throughput correction function can also be given by a correction curve of the type depicted in FIG. 2. In this special case, a correction factor 21, by which the crop moisture content signal is multiplied, is read off along the y axis 22a according to the value and is determined as a factor of the throughput quantity, which is plotted on the x axis 22b. In this case, if the throughput quantity is lower, a correction factor greater than one is applied, wherein this correction factor diminishes as the throughput quantity increases. Given a different scale for the crop moisture content signal, it would be possible, as an alternative although in a similar manner, to apply a correction factor of one for a low throughput quantity and to apply a correction factor that is less than one for a larger throughput quantity. The correction factor of one is labeled as unit value 22c in FIG. 2.

It would also be conceivable to form a surface area curve as the throughput correction function, in which case the correction function is dependent on the determined throughput quantity and on the crop moisture content signal that has not yet been corrected. In the end, therefore, a correction factor would be applied, which is dependent not only on the measured throughput quantity, as in the example shown in FIG. 2, but which is also dependent on the moisture content that is measured.

The type of crop that is picked up also influences the moisture content that is measured. In order to take this into account, it is preferably provided that the crop moisture content signal is also corrected on the basis of a determination of the crop type. This crop type determination is based on a detection of the crop type by sensors or can be based on a corresponding input by the operator.

In order to avoid a falsified result in the event that the throughput quantity is too low, it is preferably provided that, if the determined throughput quantity drops below a minimum throughput quantity 23, the crop moisture content signal is corrected to a value of the crop moisture content signal that existed before the value fell below the minimum throughput. This relationship also is evident from FIG. 2, in which the crop moisture content signal is no longer changed by the throughput correction function below the minimum throughput 23. Instead, the most recently determined value of the crop moisture content signal, with the correction taken into account, is retained. It is therefore furthermore preferred that, in such a case, the crop moisture content signal is held at the value of the crop moisture content signal before said value fell below the minimum throughput.

Figure 2:
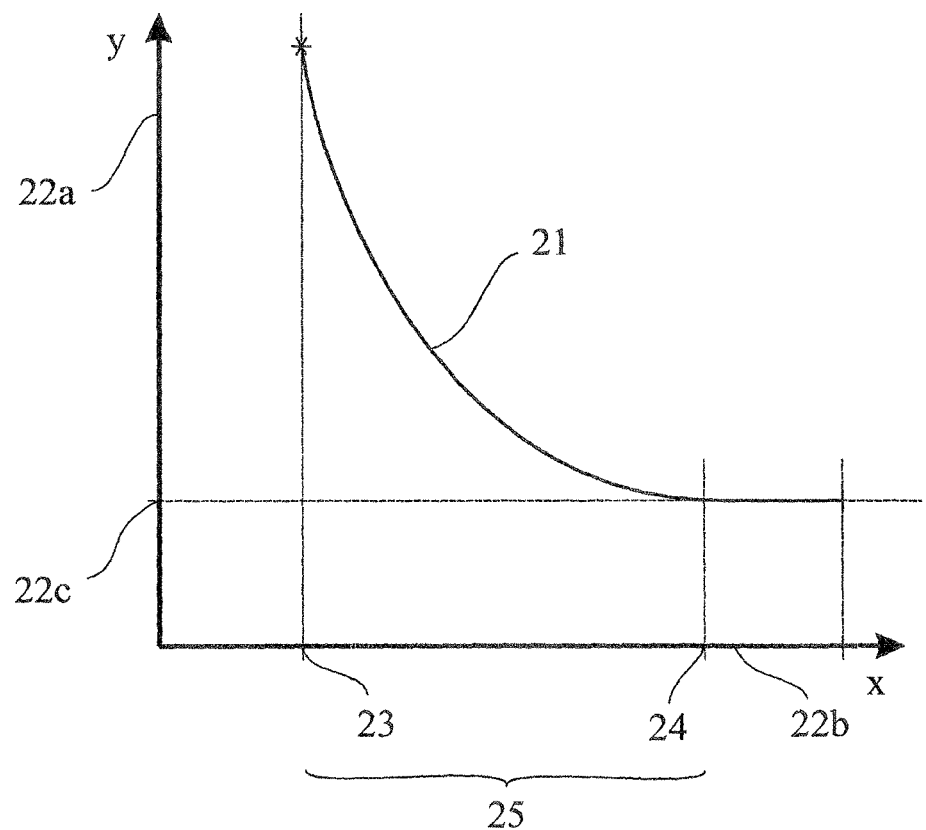
FIG. 2 shows a correction curve that can be used to correct the measured moisture content of the crop as a function of the throughput quantity according to the invention.

Conversely, when the determined throughput quantity exceeds a maximum throughput 24, it is preferable that the crop moisture content signal remain substantially unchanged by the correction. In FIG. 2, this relationship is depicted such that, above the maximum throughput 24, the throughput correction function has a constant value of one in this range, in accordance with the unit value 22c. The minimum throughput 23 and the maximum throughput 24 define a correction range 25 between these two values, as is also shown in FIG. 2. In this case, when a determined throughput quantity is located within the correction range 25, it is preferably provided that the crop moisture content signal is corrected such that a moisture content of the picked-up crop, which is measured by the moisture content sensor arrangement 3 and can be an absolute moisture content of the picked-up crop, in particular, is related as a whole to the determined throughput quantity. In this manner, a corrected crop moisture content signal is obtained that indicates moisture content as a percentage. The correction range 25 is therefore preferably located between the maximum throughput 24 and the minimum throughput 23, as shown.

Figure 3:
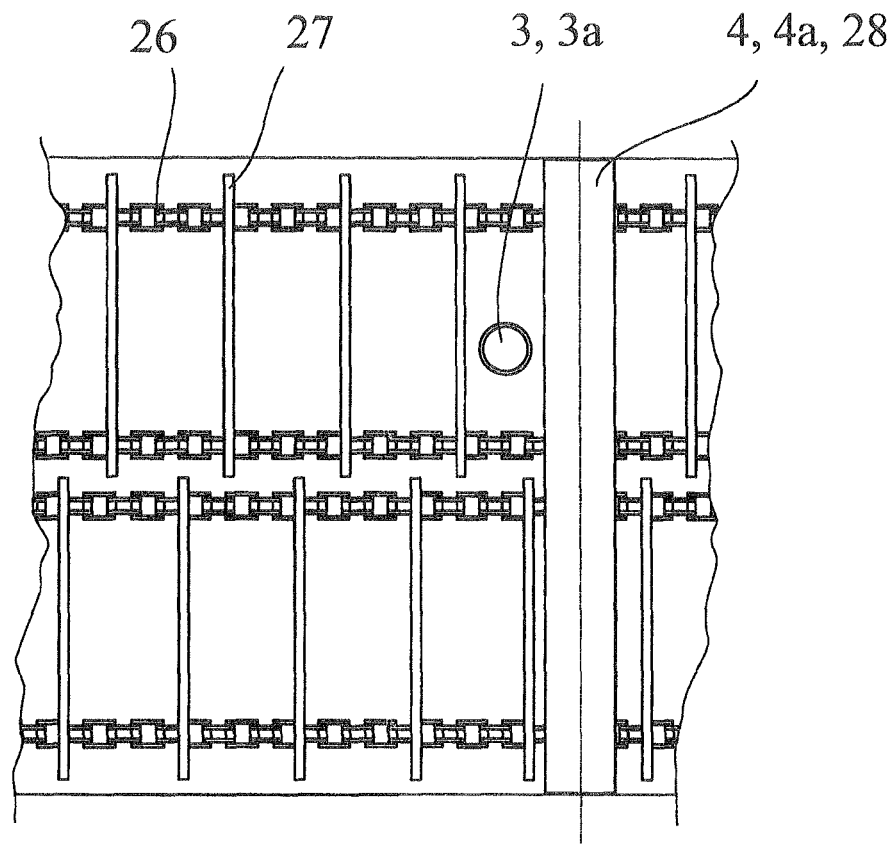
FIG. 3 shows a top view of a feed rake of the combine harvester depicted in FIG. 1.

It is also preferable that the moisture content sensor arrangement 3, as an alternative or in addition to the layer thickness sensor arrangement 4a, is disposed on the intake conveyor mechanism 2 and, in particular, in a feeder housing of the intake conveyor mechanism 2. This is depicted as an example in FIG. 3, which shows a top view of the feed rake 9 of the combine harvester 1 from FIG. 1. The roller chains 26 and the intake grates 27 are clearly shown. A layer thickness roller 28 makes it possible to determine the throughput quantity, by the aforementioned layer thickness sensor arrangement 4a, wherein said layer thickness roller is a component of the layer thickness sensor arrangement. The feeder housing is therefore substantially formed, in this section, by the top side of the feed rake 9, which is shown. The moisture content sensor arrangement 3 is also disposed on the feed rake 9.

In this context, it is preferable for the moisture content sensor arrangement 3 to be set up to contactlessly measure the moisture of the picked-up crop. In particular, the moisture content sensor arrangement 3 can comprise a capacitive sensor 3a. Other possible types of sensors for this moisture content sensor arrangement 3, which also function in a contactless manner, are near infrared sensors, wherein configurations having simple photodiodes and two or three transmitting diodes having fixed wavelengths are possible here, in particular. Other possibilities include sensors based on a microwave method or a TDR method, i.e., a time domain reflectometry method.

Furthermore, it is preferable that the agricultural working machine comprises working devices 29, which include, in particular, one or more from the group comprising the threshing mechanism 11, the front attachment 5, the separating device 15, and the cleaning device 16.

The agricultural working machine also preferably comprises a control arrangement 30 for controlling the working devices 29, wherein it is provided here that the control arrangement 30 activates the working devices 29 on the basis of the crop moisture content signal. This can be used, in particular, to optimize the threshing quality or the momentary consumption of diesel fuel. The activation of the working devices 29 can preferably take place such that the control arrangement 30 regulates the working devices 29 on the basis of the crop moisture content signal.

According to the exemplary embodiment depicted in FIG. 1, the control arrangement 30 also can be an electronic central unit 31, which also provides an electronic user interface for an operator, for example. Advantages are also obtained when the control arrangement 30 comprises automated machine setting devices, each of which is assigned to a working device 29 for activating the working device, and wherein the control arrangement 31 determines operating parameters of the automated machine setting devices on the basis of the corrected crop moisture content signal. These automated machine setting devices can be implemented in the form of software such that, for example, all these automated machine setting devices in the scope of a corresponding software run within the control arrangement 30, specifically within the electronic central unit 31 in this case. One or all of these automated machine setting devices can also be formed by a separate device, however.

The control arrangement 30 preferably carries out a control activity for controlling a working device 29 on the basis of a change in the crop moisture content signal. In other words, for example, certain routines for controlling a working device 29 are activated when defined conditions of the crop moisture content signal occur. It is preferably provided, for example, that the control arrangement 30 triggers an increase activity for controlling a working device 29 when the crop moisture content signal increases and, in particular, when an upper limit value is exceeded. As an alternative or in addition thereto, the control arrangement 30 triggers a decrease activity for controlling a working device 29 when the crop moisture content signal decreases and, in particular, falls below a lower limit value.

In addition to this particular activity, which is triggered when a value exceeds or falls below an upper or lower limit value, respectively, it also is possible for such a process to be triggered by the detection of a sufficiently great change within a time interval, i.e., the detection of a sufficiently great rate of change, independently of the direction of the change. It is therefore preferable for the control arrangement 30 to trigger a variance activity for controlling a working device 29 when a rate of change of the crop moisture content signal exceeds a variation limit value. In this connection, the triggering of such a variance activity can also be dependent on the rate of change of the crop moisture content level proceeding in a certain direction.

Such rate of change of the crop moisture content, or alteration rate, may be interpreted as an alteration of a humidity signal in a specific time interval without exceeding a specific upper or lower threshold value. If the "alteration rate" is determined to exceed a specific "alteration rate threshold," then an activity will be triggered to accommodate this higher than expected alteration rate. The responsive activity depends on the specific type of the working device 29 which has to be activated based on the detected humidity amount. Hence, the term "variance activity" is used herein for describing non-specific activities—any possible useful adjustment activities.

The increase activity, decrease activity, or variance activity can also relate to a plurality of working devices 29. It is also possible for different upper or lower limit values and variation limit values to be assigned to different working devices 29 in each case, wherein a particular increase activity, decrease activity, or variance activity can then have a different configuration depending on the working device 29 that is affected.

Figure 4:
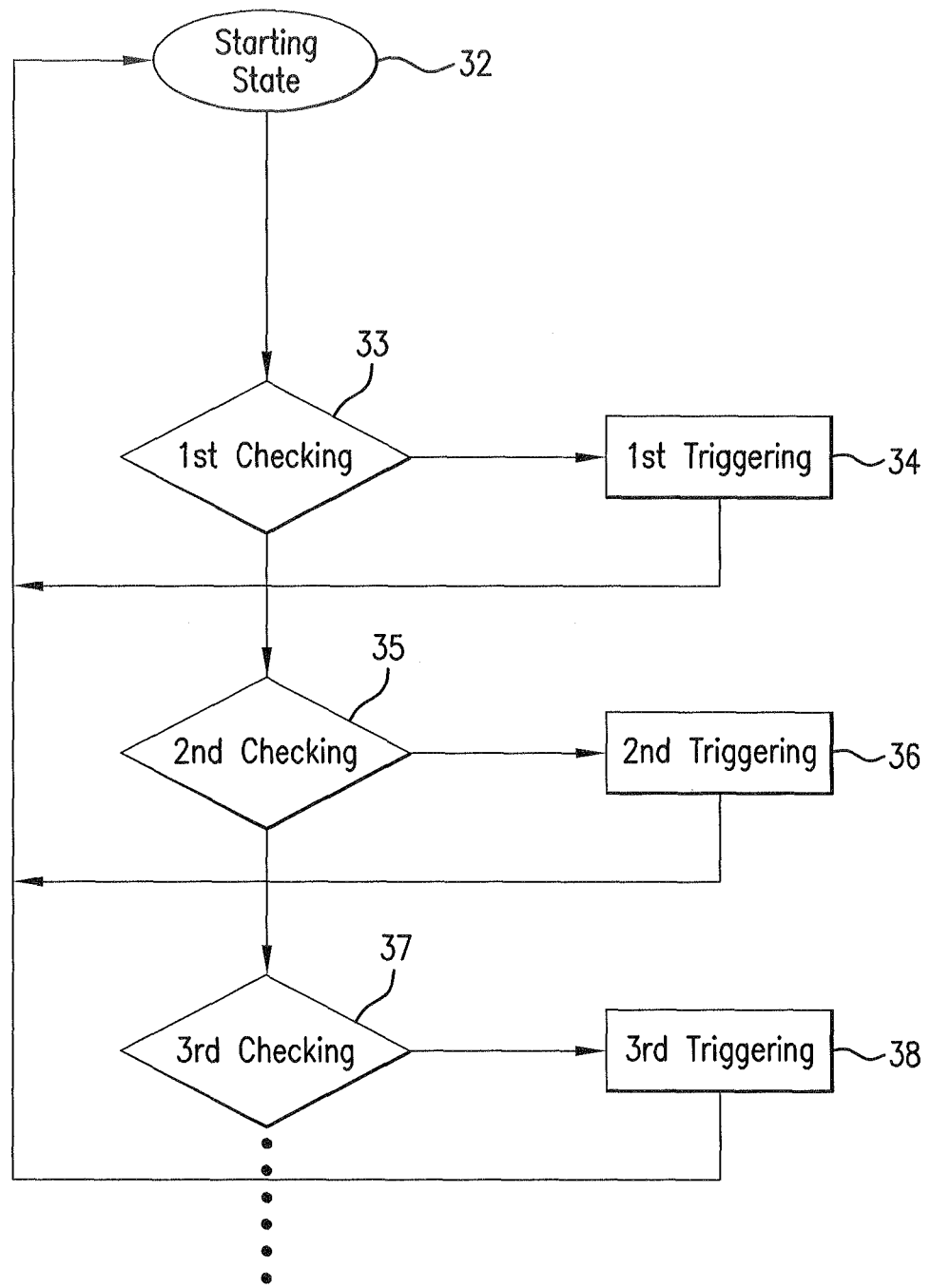
FIG. 4 shows a flow chart that depicts the activation of the working devices of the combine harvester of FIG. 1 as a function of the measured moisture content of the crop.

An example of the aforementioned variants is shown in FIG. 4, in which, proceeding from a starting state 32, a first checking step 33 is initially carried out on the upper limit value. If the upper limit value was exceeded, a first triggering step 34 of the increase activity follows. If the upper limit value was not exceeded, a check is carried out in a second checking step 35 to determine if the value fell below a lower limit value and. If below a lower limit value, the decrease activity is triggered in the second triggering step 36. If this is not the case, either, a determination is carried out in the final checking step 37 to determine whether the variation limit value was exceeded by a rate of change of the crop moisture content signal. If this is the case, the variance activity will be activated in the third triggering step 38. In this connection, it is conceivable that even more steps, in particular subsequent checking steps and corresponding triggering steps are provided.

Figure 5:
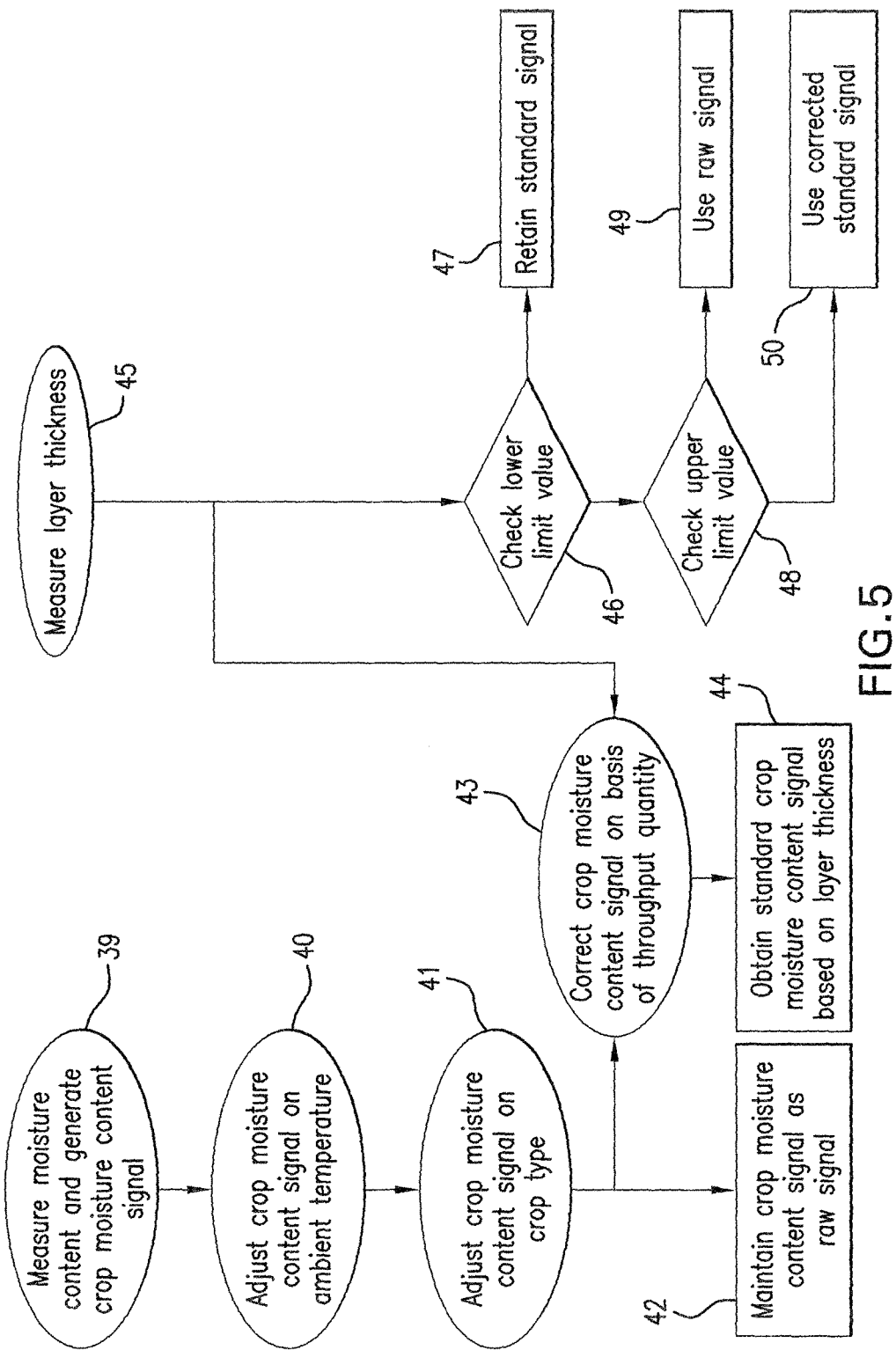
FIG. 5 shows a flow chart depicting a proposed correction of the crop moisture content signal as a function of a throughput quantity that is determined.

Similarly, FIG. 5 shows a flow chart of the correction of the crop moisture content signal in the combine harvester from FIG. 1. At the beginning, in a crop moisture content determination step 39, the moisture content of the picked-up crop is measured by the moisture content sensor arrangement 3 and the crop moisture content signal is generated on the basis thereof. In the subsequent temperature compensation step 40, the crop moisture content signal is adjusted on the basis of an ambient temperature that is measured. In the subsequent crop type correction step 41, the crop moisture content signal is corrected on the basis of a determination of the crop type. As an alternative, when a correction is carried out by means of a correction curve, the selection of the correction curve can be based on the crop type that was determined.

The crop moisture content signal, which may have been adjusted but which has not yet been subjected to a correction according to the invention, is retained as the raw signal 42. On the other hand, the crop moisture content signal also is subjected to a correction on the basis of the determined throughput quantity in the correction step 43 in the manner that was described above (FIG. 2), whereby the standard signal 44, which is based on the layer thickness, is obtained. As described above, this correction is dependent on the determined throughput quantity of the crop moisture content signal, and therefore, in order to determine the throughput quantity, the measured layer thickness is received by the layer thickness sensor arrangement 4a and the throughput quantity is determined therefrom in the layer thickness measurement step 45, which is simultaneous with the crop moisture determination step 39.

In the lower limit value checking step 46, which follows the correction step 43, it is determined whether the determined throughput quantity is less than the minimum throughput 23. If so, in the retention step 47, the most recently valid crop moisture content signal, specifically, the standard signal 44 after the correction that existed before the value fell below the minimum throughput 23 is treated as the currently valid crop moisture content signal.

If the value did not fall below the minimum throughput, a check is carried out in the upper limit value checking step 48 to determine whether, instead, the determined throughput quantity exceeded the maximum throughput. If so, in the raw processing step 49, the raw signal 43 is used as the valid crop moisture content signal, because, as described above, the correction is not necessary in this case or would result in a value that is identical to the raw signal 43. In contrast, if the maximum throughput is not exceeded, the determined throughput quantity is located in the correction range and the corrected standard signal 44 is used further as the valid crop moisture content signal in the correction processing step 50, e.g., for the above-described determination of operating parameters of the automated machine setting devices.

Another preferred embodiment of the corrected crop moisture content signal is described in the following in conjunction with an overload protection. In this case, the control arrangement 31 preferably provides an overload protection when controlling the working devices 30, in particular the threshing mechanism 11. That is, when an overload is detected, the control arrangement 30 activates the working devices 29 according to an overload protection routine. In addition, a sensitivity threshold for detecting the overload is preferably based on the crop moisture content signal.

This can be implemented, in particular, by providing the agricultural working machine with a drive 51 and a clutch 52 for operating the threshing mechanism 11 and basing a slip threshold for the clutch 52 for detecting the overload on the crop moisture content signal. Therefore, an overload is detected when the slip of the clutch 52, which can be a belt coupling, in particular, exceeds the slip threshold. It can be provided in this case, for example, that either 8%, 13% or 18% slip can be defined as the slip thresholds, wherein the currently valid slip threshold is selected depending on the crop moisture content signal.

Another application relates to the possibility for mapping grain moisture. To this end, the control arrangement 31 is preferably set up to record the crop moisture content signal for mapping purposes. In addition, the control arrangement 31 is set up to relate the crop moisture content signal to position data of the agricultural working machine during the pick-up of the crop and to transfer the recorded crop moisture content signal with the related position data of the agricultural working machine to a remote computer unit. This transfer may be carried out via a wireless interface, e.g., for a GSM system. Important information for subsequent agricultural processing is obtained in this manner.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural working machine for processing crop, comprising:
   an intake conveyor mechanism for picking up the crop and forming a picked-up crop flow;
   a moisture content sensor arrangement comprising a capacitive sensor that generates a stray field with field lines that extend into the picked-up crop flow, for measuring a moisture content of the picked-up crop flow and generating a crop moisture signal based on the measured moisture content; and a throughput sensor arrangement for determining a throughput quantity of the picked-up crop flow;

wherein the crop moisture content signal is corrected based on the throughput quantity of the picked-up crop flow that is determined by the throughput sensor arrangement.

2. The agricultural working machine according to claim 1, wherein the crop moisture content signal is generated substantially continuously or the throughput quantity is determined substantially continuously based on the crop moisture content signal.

3. The agricultural working machine according to claim 1, wherein the crop moisture content signal is corrected based on the determined throughput quantity by use of a throughput correction function.

4. The agricultural working machine according to claim 1, wherein the crop moisture content signal is corrected based on the crop type determination.

5. The agricultural working machine according to claim 1, wherein if the determined throughput quantity drops below a minimum throughput quantity, the crop moisture content signal is corrected to a value of the crop moisture content signal that existed before the value fell below the minimum throughput.

6. The agricultural working machine according to claim 1, wherein when the determined throughput quantity exceeds a maximum throughput, the crop moisture content signal remains substantially unchanged by the correction.

7. The agricultural working machine according to claim 1, wherein when a determined throughput quantity is located within the correction range, the crop moisture content signal is corrected such that a moisture content of the picked-up crop is related as a whole to the determined throughput quantity of the picked-up crop flow.

8. The agricultural working machine according to claim 1, wherein the moisture content sensor arrangement or a layer thickness sensor arrangement or an arrangement comprising both a content sensor and a thickness sensor is disposed on the intake conveyor mechanism.

9. The agricultural working machine according to claim 1, further comprising:

working devices at least including a threshing mechanism and a front attachment, and a control arrangement for controlling the working devices, wherein the control arrangement activates the working devices based on the crop moisture content signal, regulates the working devices based on the crop moisture content signal or both activates and regulates the working devices based on the crop moisture content signal.

10. The agricultural working machine according to claim 9, wherein the control arrangement comprises automated machine setting devices, each of which is assigned to a working device of the working devices for activating the working device, and wherein the control arrangement determines operating parameters of the automated machine setting devices based on the corrected crop moisture content signal.

11. The agricultural working machine according to claim 9, wherein the control arrangement carries out a control activity for controlling the working devices based on a change in the crop moisture content signal.

12. The agricultural working machine according to claim 11, wherein the control arrangement triggers action of the group consisting of: an increase activity for controlling one of the working devices when the crop moisture content signal increases above an upper limit value, a decrease activity for controlling one of the working devices when the crop moisture content signal decreases below a lower limit value, a variance activity for controlling a working device when a variation limit value is exceeded by a rate of change of the crop moisture content signal and a combination thereof.

13. The agricultural working machine according to claim 9, wherein the control arrangement provides an overload protection when controlling the working devices, wherein when an overload is detected, the control arrangement activates the working devices according to an overload protection routine, wherein a sensitivity threshold for detecting the overload is based on the crop moisture content signal.

14. The agricultural working machine according to claim 13, wherein the agricultural working machine has a drive and a clutch for operating the threshing mechanism and wherein a slip threshold of the clutch for detecting the overload is based on the crop moisture content signal.

15. The agricultural working machine according to claim 9, wherein the control arrangement is set up to record the crop moisture content signal for mapping purposes to relate the crop moisture content signal to position data of the agricultural working machine during the pick-up of the crop.

16. The agricultural working machine according to claim 15, wherein the control arrangement is set up to transfer the recorded crop moisture content signal with the related position data of the agricultural working machine to a remote computer unit.

17. The agricultural working machine according to claim 1, wherein the throughput sensor arrangement is a layer thickness sensor arrangement.

18. The agricultural working machine according to claim 5, wherein the crop moisture content signal is held at the value of the crop moisture content signal before the value fell below the minimum throughput.

19. The agricultural working machine according to claim 7, wherein the correction range is located between a maximum throughput and a minimum throughput.

20. The agricultural working machine according to claim 8, wherein the arrangement is located in a feeder housing of the intake conveyor mechanism.

* * * * *